Oct. 21, 1941.  H. MILLER  2,260,151
MEANS FOR PREVENTING THE FREEZING OF RISER PIPES
Filed April 6, 1940  2 Sheets-Sheet 1
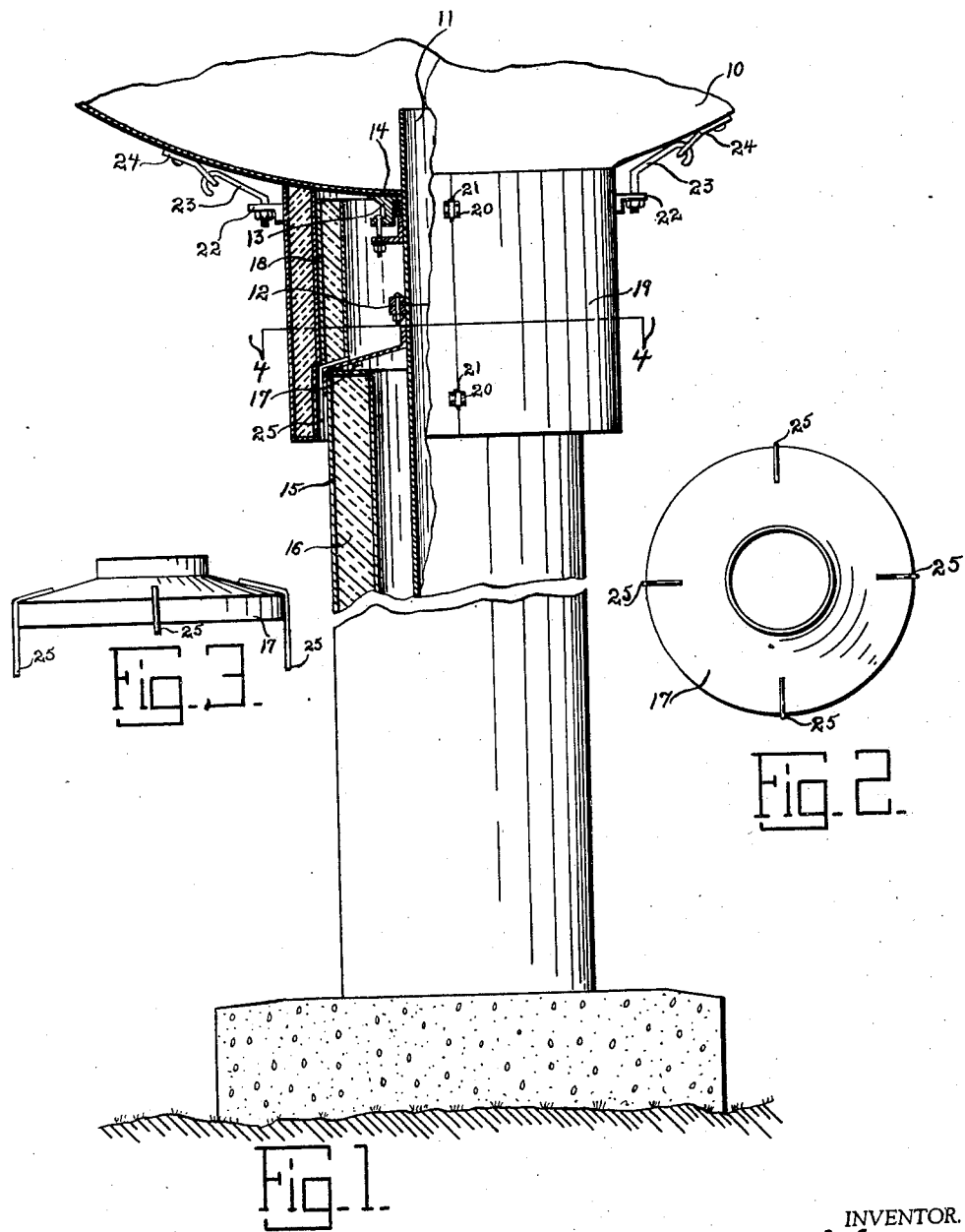
INVENTOR.
HERBERT MILLER
BY M. Talbert Dick
ATTORNEY.

Oct. 21, 1941.  H. MILLER  2,260,151
MEANS FOR PREVENTING THE FREEZING OF RISER PIPES
Filed April 6, 1940  2 Sheets-Sheet 2
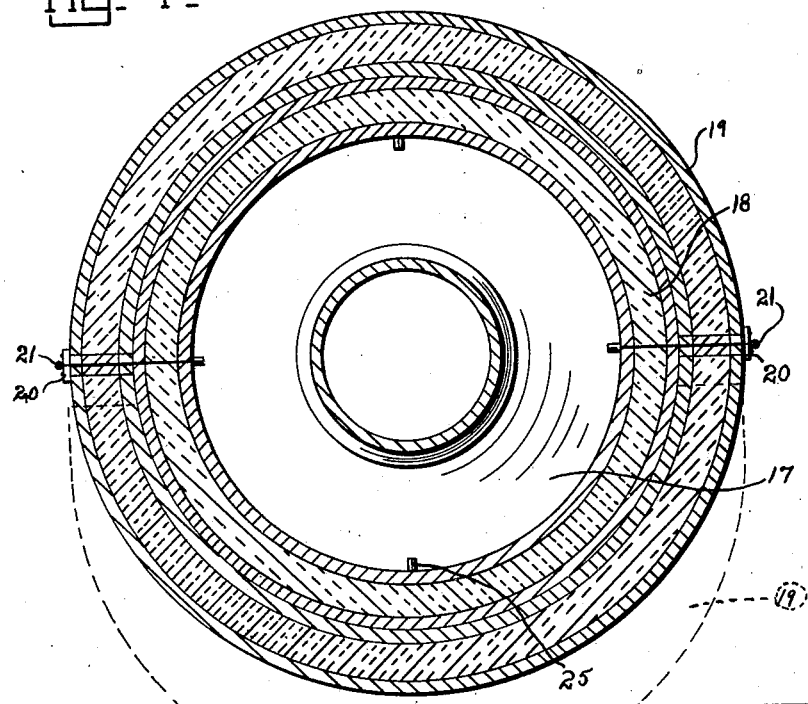
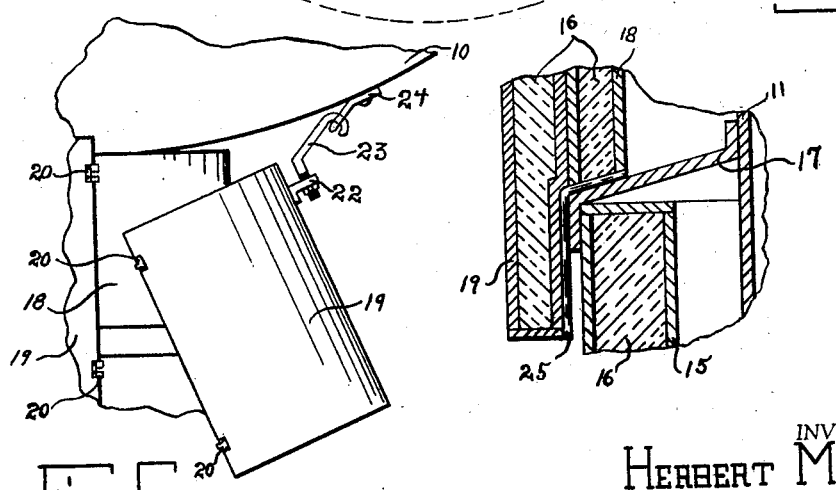
INVENTOR.
HERBERT MILLER.
BY M. Talbert Dick
ATTORNEY.

Patented Oct. 21, 1941

2,260,151

UNITED STATES PATENT OFFICE 2,260,151

MEANS FOR PREVENTING THE FREEZING OF RISER PIPES

Herbert Miller, Des Moines, Iowa, assignor to Pittsburgh-Des Moines Steel Company, Pittsburgh, Pa., a copartnership Application April 6, 1940, Serial No. 328,370

11 Claims. (Cl. 137—21)

The principal object of my invention is to provide a frost case for the riser pipes of elevated liquid tanks that not only prevents the freezing of the riser pipe, but eliminates the collection of frost or ice in the insulating material surrounding the riser pipe or between the riser pipe and the insulation.

A further object of my invention is to provide a sealing means below the usual expansion unit of the riser pipe for preventing water and moisture from penetrating downwardly into the insulating material or between the housing containing the insulating material and the riser pipe.

A still further object of my invention is to provide a means for opening that part of the frost casing surrounding the expansion joint unit and sealing means for gaining access to the upper part of the riser pipe and associated units for repairs or adjustments.

A still further object of my invention is to provide an efficient frost case for riser pipes that is not massive or complicated in construction.

A still further object of my invention is to provide a frost case for riser pipes that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which::

Fig. 1 is a side view of my frost case in place and with sections cut away to illustrate its construction.

Fig. 2 is a top plan view of the cone-shaped sealing cap.

Fig. 3 is a side view of the sealing cap.

Fig. 4 is an enlarged cross sectional view of my device taken on line 4—4 of Fig. 1 and more fully illustrates the arrangement and construction of parts.

Fig. 5 is an enlarged sectional view of a portion of the frost case and illustrates in detail the method of exciting any water or moisture collecting in the upper portion of the unit.

Fig. 6 is an enlarged side view of the upper portion of my frost case and shows the manner in which a section of the frost case may be swung open for installation, repairs or adjustments.

It is well known that in cold climates the riser pipes for elevated water supply tanks must be insulated against freezing of the liquid in the riser pipe. The most common method of preventing the freezing of these pipes is to surround them with a casing of insulation material. In many instances the casing of insulation is spaced apart from the riser pipe to provide an air space between the insulation and the pipe proper. Such casings and insulation material extend from the ground upwardly to the bottom of the tank and in many instances water or moisture will collect in the insulation or in the area between the riser pipe and the insulation. This is highly objectionable as it reduces the efficiency of the insulation and in some instances causes the collapse of the same. Applicant has overcome such troubles as will hereinafter be appreciated.

Referring to the drawings, I have used the numeral 10 to designate an ordinary elevated water tank having the usual riser pipe 11 extending upwardly and communicating with the inside lower portion of the bottom of the tank. It is common practice to put a short section of pipe of a different metal such as brass at the upper portion of the riser pipe and where it extends into the tank 10. It is common practice to connect these two pipes together by collar and bolt units 12. In order to reduce moisture and water seeping out of the tank 10 at the point where the riser pipe extends into the bottom of the tank, the usual packing gland 13 and packing 14 is used. The numeral 15 designates the major frost casing loosely surrounding the riser pipe 10, and which extends from the ground or base portion upwardly to a position a short distance below the tank 10 as shown in Fig. 1. Such casings are usually of comparatively light sheet metal and are filled with insulating material 16, such as rock wool or like. It is to such an insulation that I install my unit assembly and which I will now describe in detail. The numeral 17 designates a cone-shaped cap sealing element with a center collar portion tightly embracing the pipe 11 and below the expansion joint portion as shown in Fig. 1. This cap which is in the form of a plate, extends downwardly and outwardly, and then directly downwardly to embrace the outer upper side wall of the frost casing 15. As the cap extends over the space between the casing and pipe 11 and also over the upper end of the casing 15, any moisture or water forming above the cap will be definitely prevented from entering the inside of the casing 15, its insulation therein, or the space between the riser pipe and the frost case. The numeral 18 designates a casing loosely extending around the upper portion of the riser pipe 11 and resting on the upper outer marginal edge of the cap 17. This case may be cut in half as shown in Fig. 4 to facilitate its placement or removal and is provided with the usual insulating material 16. As will be noted in Fig. 1, this casing terminates a slight distance from the bottom of the tank 10. This space between the top of the casing and the tank 10 permits further contraction and expansion of the tank riser pipe and casings relative to each other. The numeral 19 designates a comparatively short outer frost casing consisting of two duplicate sections. When these two sections are placed together as shown in the drawings, a continuous circular casing is provided with its upper edge tightly engaging the bottom of the tank 10 and its lower portion embracing the upper portion of the casing 15. The two sections of the casing may be secured together by any suitable type of latching or hinging means. In the drawings I show the two sections of the case 19 held together by the use of ordinary hinges 20, having the usual pull pin 21. When it is desired to open up the casing, it is merely necessary to pull two or more of these pins 21. If two pins are pulled on one line between the two sections, the sections will obviously be capable of outward swinging movement relative to each other and the exposing of the inside of my unit. However, with the pins all in place, the member 19 will be held together as a collar unit. Any suitable means may be used to hold this member 19 upwardly on the bottom of the tank 10. In the drawings, I use the numeral 22 to designate one or more bracket elements secured on each section of the member 19. The numeral 23 designates a hook bolt extending through each of the bracket members 22. However, all these hook bolts have their upper hooked end portion hooked through a bracket 24, rigidly secured to the bottom of the tank 10 as shown in Fig. 1. By this construction, entrance may be obtained by removing all of the pins 21 and then each section of the member 19 may swing outwardly but be supported on the bottom of the tank 10 as shown in Fig. 6. With a section or sections of the member 19 moved outwardly, the inner casing 18 may be removed in section, exposing the expansion joint and the entire area above the cap and below the bottom center portion of the tank 10. If it is desired to completely remove one of the sections of the member 19, it is merely necessary to unhook the hooked bolt from the bracket on the tank 10. With the two sections 19 in place and the pins 21 holding the sections together, the nuts of the hook bolts may be tightened in order to draw the collar case 19 upwardly and tightly into the bottom of the tank 10. Obviously any moisture or water that would collect within the upper portion of my unit by leakage at the expansion joint or by condensation will pass downwardly until it engages the cap 17. From the top of the cap 17 this water will be forced to move outwardly on the cap and thence downwardly between the case 19 and case 15 and to the outer side of the case 15 where it can do no damage. In order to facilitate the passage of any water from the surface of the cap 17 to the outside atmosphere, I have provided a plurality of tubes 25 having their upper ends terminating on the upper surface of the cap 17, and thence extending downwardly between the case 16 and case 19, and their lower ends terminating at the bottom edge of the case 19 as shown in Fig. 1.

From the foregoing it will readily be seen that I have provided a means for preventing water or like to get into the insulation of the casing 15 or between the casing 15 and pipe 11 and freeze. It will also be obvious that by the construction, arrangement and support of the member 19, access may be easily had to the upper assembly of the pipe 11. By the collar case 19 having its lower end embracing the upper end of the case 15, expansion and contraction will be automatically compensated for. The casings 15, 18 and 19 are all of the usual hollow construction having insulation material 16.

Some changes may be made in the construction and arrangement of my improved means for preventing the freezing of riser pipes without departing from the real spirit and purpose of my invention, and it is my intention to cover by my claims any modified forms of structure or use of mechanical equivalents which may be reasonably included within their scope.

I claim:

1. In combination with an elevated tank and riser pipe, a pipe insulation structure comprising, an insulating unit embracing said riser pipe and terminating a distance below said tank, a plate embracing said riser pipe and extending over the upper marginal edge of said insulating unit, and an insulating collar unit having its upper end engaging said tank and its lower end portion embracing the upper end portion of said first mentioned insulating unit.

2. In combination with an elevated tank and riser pipe, a pipe insulation structure comprising, an insulating unit embracing said riser pipe and terminating a distance below said tank, a plate embracing said riser pipe and extending over the upper marginal edge of said insulating unit, an insulating collar unit having its upper end engaging said tank and its lower end portion embracing the upper end portion of said first mentioned insulating unit, and a tube having one end terminating adjacent the upper surface of said plate and its other end communicating with the outside atmosphere.

3. In combination with an elevated tank and riser pipe, a pipe insulation structure comprising, an insulating unit embracing said riser pipe and terminating a distance below said tank, a plate embracing said riser pipe and extending over the upper marginal edge of said insulating unit, an insulating collar unit having its upper end engaging said tank and its lower end portion embracing the upper end portion of said first mentioned insulating unit, and a plurality of side tubes having their upper ends terminating adjacent the upper surface of said plate and their lengths extending downwardly between said insulating unit and said collar.

4. In combination with an elevated tank and a riser pipe communicating with the inside of the same, an insulating unit embracing said riser pipe and terminating a distance below the bottom of said tank, a sealing cap embracing said riser pipe and extending outwardly and downwardly to cover and embrace the upper edge of said insulating unit, a sectioned insulating collar unit having its lower end embracing the upper portion of said first mentioned insulating unit, and a quick detachable means for holding the sections of said collar together.

5. In combination with an elevated tank and a riser pipe communicating with the inside of the same, an insulating unit embracing said riser pipe and terminating a distance below the bottom of said tank, a sealing cap embracing said riser pipe and extending outwardly and downwardly to cover and embrace the upper edge of said insulating unit, a sectioned insulating collar unit having its lower end embracing the upper portion of said first mentioned insulating unit, and a means for hinging the sections of said collar together.

6. In combination with an elevated tank and a riser pipe communicating with the inside of the same, an insulating unit embracing said riser pipe and terminating a distance below the bottom of said tank, a sealing cap embracing said riser pipe and extending outwardly and downwardly to cover and embrace the upper edge of said insulating unit, a sectioned insulating collar unit having its lower end embracing the upper portion of said first mentioned insulating unit, a means for hinging the sections of said collar together, and a second means for hingedly securing each of said sections to said tank.

7. In combination with an elevated tank and a riser pipe communicating with the inside of the same, an insulating unit embracing said riser pipe and terminating a distance below the bottom of said tank, a sealing cap embracing said riser pipe and extending outwardly and downwardly to cover and embrace the upper edge of said insulating unit, a sectioned insulating collar unit having its lower end embracing the upper portion of said first mentioned insulating unit, an adjustable means for hinging the sections of said collar together, and a second adjustable means for hingedly securing each of said sections to said tank.

8. A pipe insulation structure for riser pipes for elevated tanks comprising, an insulating unit embracing said riser pipe and terminating a distance below said tank, another insulating unit embracing said riser pipe between said tank and first said insulating unit, the upper end of said second insulating unit terminating only a slight distance below the bottom of said tank, and an insulating collar around said second insulating unit having its upper end engaging said tank and its lower portion embracing the top portion of the first said insulating unit whereby the units insulating the riser pipe may expand and contract without materially effecting the degree of perfection of the insulation being provided for the riser pipe.

9. An insulating structure as specified in claim 8 in which a downwardly and outwardly extending plate embracing said riser pipe extends over the upper end of the first said insulation unit below the bottom end of the second said insulating unit.

10. An insulating structure as specified in claim 8 in which a downwardly and outwardly extending plate embracing said riser pipe extends over the upper end of the first said insulation unit below the bottom end of the second said insulating unit and in which drainage means is provided extending from the upper surface of said plate between the first said insulating unit and the insulating collar to the out of doors.

11. In combination with an elevated tank and a riser pipe communicating with the inside of the same, an insulating unit embracing said riser pipe and terminating a distance below the bottom of said tank, a sectioned insulating collar unit having its lower end embracing the upper portion of said insulating unit, and means for hinging each of the sections of said collar to the tank.

HERBERT MILLER.